(12) United States Patent
Hutterer

(10) Patent No.: US 7,549,604 B2
(45) Date of Patent: Jun. 23, 2009

(54) FUEL EFFICIENT FIXED WING AIRCRAFT

(76) Inventor: Joseph A. Hutterer, 443 Elpyco, Wichita, KS (US) 67218

( * ) Notice: Subject to any disclaimer, the term of this patent is extended or adjusted under 35 U.S.C. 154(b) by 327 days.

(21) Appl. No.: 11/553,016

(22) Filed: Oct. 26, 2006

(65) Prior Publication Data

US 2008/0099599 A1    May 1, 2008

(51) Int. Cl.
B64D 27/14    (2006.01)

(52) U.S. Cl. .......................................... 244/54

(58) Field of Classification Search .................. 244/54, 244/56, 102 R; 138/37
See application file for complete search history.

(56) References Cited

U.S. PATENT DOCUMENTS

| | | | |
|---|---|---|---|
| 3,134,561 A * | 5/1964 | Clejan .......................... | 244/58 |
| 3,302,907 A * | 2/1967 | Wilde et al. .................... | 244/55 |
| 3,349,566 A | 10/1967 | Tyrrell et al. | |
| 3,363,860 A * | 1/1968 | Maguire ........................ | 244/54 |
| 3,451,648 A * | 6/1969 | Haberkorn et al. ............. | 244/56 |
| 3,529,791 A * | 9/1970 | Weigmann .................... | 244/54 |
| 4,130,258 A | 12/1978 | Fox | |
| 4,676,458 A | 6/1987 | Cohen | |
| 5,480,107 A | 1/1996 | Bacon | |
| 5,529,263 A | 6/1996 | Rudolph | |
| 5,765,778 A | 6/1998 | Otuska | |
| 6,247,668 B1 | 6/2001 | Reysa et al. | |
| 6,845,606 B2 | 1/2005 | Franchet et al. | |
| 6,926,232 B2 | 8/2005 | Franchet et al. | |

* cited by examiner

*Primary Examiner*—Tien Dinh
(74) *Attorney, Agent, or Firm*—Kenneth H. Jack; Davis & Jack, L.L.C.

(57) ABSTRACT

A fixed wing aircraft having a fuselage having a forward end and a rearward end, the fuselage's forward end forming a nose section; the aircraft further having a primary thrust turbo-prop engine fixedly mounted upon the fuselage's rearward end; the aircraft further having an auxiliary thrust turbo-fan jet engine; the aircraft further having a pivot axle and support strut combination interconnecting the auxiliary thrust turbo-fan engine and the fuselage, the pivot axle and support strut combination positioning the auxiliary thrust turbo-fan jet engine within the fuselage's nose section; the aircraft further having an auxiliary thrust port extending through an outer wall of the nose section, the pivot axle and support strut combination being adapted for alternately moving the turbo-fan engine between first and second positions, the turbo-fan engine residing within the nose section upon movement to the first position, the turbo-fan engine outwardly overlying the auxiliary thrust port upon alternate movement to the second position.

12 Claims, 5 Drawing Sheets

FUEL EFFICIENT FIXED WING AIRCRAFT

FIELD OF THE INVENTION

This invention relates to internal combustion engine powered fixed wing aircraft. More particularly, this invention relates to engine mount configurations applicable to such aircraft.

BACKGROUND OF THE INVENTION

Propeller driven fixed wing aircraft typically have an optimal level flight cruising speed at which the airplane's air speed and the airplane's rate of fuel consumption are deemed to be acceptable in relation to each other. At speeds above an aircraft's optimal cruising speed, the benefits of reduced transit time are viewed as being negatively "outweighed" by the corresponding reduction in fuel economy. Conversely, at air speeds below the aircraft's optimal cruising speed, the resultant benefit of increased fuel economy is viewed as being negatively "outweighed" by the corresponding increase in transit time. Accordingly, an airplane's optimal cruising speed may vary from time to time as the result of changing demands of passengers on transit time and the price of aircraft fuel.

For small aircraft (Such as, for example, a fixed wing turbo-prop aircraft, capable of carrying up to nine passengers, and approved for operation by a single pilot) a single turbo-prop engine is typically capable of maintaining the aircraft in level flight at such an optimal cruising speed which balances fuel costs and time costs. For such an aircraft, optimal cruising speeds are typically sub-sonic speeds ranging between 200 and 400 mph. Omitting safety considerations, for the sake of enhanced fuel economy it is often desirable that an aircraft's optimal cruising speed be maintained by a minimum number of engines. For small aircraft, such minimum number typically is one.

However, a problem or deficiency associated with providing such small exemplary aircraft with a non-redundant or single turbo-prop engine is recognized in situations where flying conditions create a need for forward thrust over and above that which is normally needed for maintaining the optimal cruising speed. Examples of such flying conditions include the increased power demands of aircraft icing, and climbing in altitude to clear terrain obstructions or adverse weather conditions. In such circumstances, a single turbo-prop engine may have insufficient reserve power over its normal optimal cruising speed power to maintain flight. A further drawback or deficiency related to such provision of a single turbo-prop engine may be catastrophically recognized upon an engine failure which requires an unpowered glide to landing in order to avoid a crash.

In the design of small aircraft, the above described drawbacks and deficiencies associated with non-redundant provisions of a single turbo-prop engine are typically recognized as grossly overriding the fuel efficiency benefits of such single engines. Accordingly, such small aircraft are often negatively affected by design compromises wherein left and right wing mounted "tractor" turbo-prop engines are provided, or wherein left and right wing mounted "pusher" configured turbo-prop engines are provided. In order for such dual or left and right turbo-prop engines to provide adequate power supply redundancy in the case of an engine failure, each of such engines is typically sized sufficiently large to independently maintain the aircraft in level flight and to further compensate for impaired aerodynamics (e.g., from hard left or right rudder) which typically results from a lateral thrust imbalance.

Provision of such dual turbo-prop engines markedly reduces the airplane's fuel economy below that which is achievable by the exemplary single turbo-prop aircraft described above. While such twin turbo-prop aircraft typically have a higher normal cruising speed than single turbo-prop aircraft, such additional speed is attained at a cost of reduced fuel efficiency. Accordingly, such typical provision of redundant turbo-prop engines in a small fixed wing aircraft often constitutes a less than desirable safety/fuel efficiency design compromise.

The instant inventive fixed wing aircraft solves or ameliorates the above discussed problems and deficiencies of both single engine turbo-prop aircraft and turbo-prop aircraft having engine redundancy, while preserving the benefits of both. Such benefits are attained by configuring the inventive aircraft to include a preferably rearwardly mounting "pusher" turbo-prop engine, such engine being redundantly backed up and/or assisted by a nose mounted, and preferably alternately extendable and retractable, auxiliary jet engine.

BRIEF SUMMARY OF THE INVENTION

A first structural component of the instant inventive fixed wing aircraft comprises a conventional aircraft fuselage having a forward nose end and having a rearward tail end. While the inventive aircraft is "scalable" covering a wide spectrum of aircraft sizes, the fuselage of an exemplary embodiment may be sized to seat up to nine passengers, along with moderate luggage, or an equivalent amount of cargo. The fuselage necessarily houses a forwardly positioned cockpit, and the extreme forward end of the fuselage preferably forms a substantially conical and forwardly domed nose section. An auxiliary thrust port preferably extends through and opens at the outer wall or "skin" of the nose section of the inventive aircraft.

A further structural component of the instant inventive fixed wing aircraft comprises primary thrust means, such means necessarily being fixedly mounted at the fuselage's rearward end. Preferably, the primary thrust means comprises motor means consisting of a single engine driven "pusher" configured propeller. Such engine preferably comprises a turbo-prop engine housed immediately forward of the propeller and within the fuselage's extreme rearward end. Suitably, though less desirably, the primary thrust means may alternately comprise a "pusher" propeller driven by a reciprocating piston engine, such engine's fuel also being burnable by the preferred auxiliary turbo-fan jet engine which is discussed below. Also suitably, though equally less desirably, the primary thrust means may alternately comprise a turbo-fan or turbo-jet engine. Of such suitable alternate primary thrust means, the turbo-prop's commonly known fuel efficiency superiority at cruising speeds between 200 and 400 mph makes it the most preferred primary thrust means.

The rearward or "pusher" configuration of the preferred single turbo-prop primary thrust means provides multiple advantages, including aerodynamic benefits, auditory benefits, and image benefits. Aircraft which have "tractor" configured nose mounted or wing mounted turbo-props undesirably tend to cast turbulent propeller driven air over wing and fuselage surfaces, and such aircraft undesirably create their own "headwind" to the extent that leading edges of their wings and tails impinge upon rearwardly propelled air. In contrast, the pusher propeller of the instant inventive aircraft aerodynamically propels air rearwardly and away from all other aircraft surfaces. Additional auditory benefits in the form of reduced cabin noise are achieved by such preferred rear turbo-prop positioning. A further benefit of the preferred rearwardly positioned turbo-prop engine is one of image, such configuration being typically viewed as being in the nature of an "executive" aircraft configuration as opposed to the more utilitarian image often attributed to other turbo-prop configurations.

A further structural component of the instant inventive aircraft comprises auxiliary thrust means. Preferably, the auxiliary thrust means comprises a turbo-fan jet engine. Suitably, though less desirably, the auxiliary thrust means may alternately comprise a turbo-jet engine. Turbo-fan jet engines are characteristically known to be both fuel efficient and quiet. Such characteristics make turbo-fan engines superior to turbo-jet engines, and makes the turbo-fan jet engine the preferred auxiliary thrust means. Suitably, though markedly less desirably, other jet engine types such as pulse jets or ram jets may be substituted for the preferred turbo-fan jet engine.

Auxiliary jet engine mounting means are necessarily provided, such means operatively interconnecting the auxiliary thrust means and one of the aircraft's rigid structural members within the fuselage. Necessarily, the engine mounting means positions the auxiliary thrust means at the forward end of the aircraft's fuselage, and preferably within the aircraft's forward nose section. The required forward positioning of the auxiliary thrust means advantageously assists in longitudinally centralizing the aircraft's center of gravity, counter-balancing the rearward turbo-prop engine. Also, as a result of the laterally central location of the aircraft's nose section, the preferred positioning of the auxiliary jet engine within the nose section minimizes the engine's introduction of undesirable yaw forces or moments about the aircraft's vertical axis. A further benefit achieved by virtue of the preferred nose section positioning of the auxiliary thrust engine is enhanced passenger and cargo space economy.

Where the auxiliary thrust means occupies its preferred position within the inventive aircraft's nose section, an auxiliary thrust port extending through a wall of the nose section is necessarily provided for facilitating the auxiliary jet engine's forwardly directed propulsion. Suitably, the mounting means may immovably position the auxiliary jet engine within the nose section and the auxiliary thrust port may receive an output end of a jet engine exhaust directing "S" duct. However, for purposes of promotion of space economy and ease of provision of inlet air to the turbo-fan engine, the auxiliary thrust port is preferably fitted for facilitating alternate outward extension and inward retraction of the complete auxiliary jet engine. In such preferred configuration, the mounting means is preferably adapted for alternately moving the jet engine between an inwardly retracted first position and an outwardly extended second position. Upon movement of the auxiliary jet engine by such preferably configured mounting means to the first position, the auxiliary jet engine resides out of the air stream and within the fuselage's nose section. Alternately, upon actuated movement by such means to the second position, the auxiliary jet engine extends from and outwardly overlies the auxiliary thrust port. While the auxiliary jet engine occupies its outwardly extended second position, both the engine's front air inlet and its rear exhaust open substantially perpendicularly with the direction of the air stream and line of travel.

Where the mounting means comprises an actuator adapted for alternately extending and retracting the auxiliary jet engine out of and into the nose section, such actuator preferably comprises at least a first rigid support strut, such strut having a proximal end mounted pivotably within the interior of the aircraft's nose section. The distal or outer end of the at least first strut is preferably rigidly mounted to and supports the auxiliary jet engine. In a preferred actuator configuration, the pivotal mount of the inner or proximal end of the at least first strut comprises a longitudinally extending axle rod, such rod being mounted pivotally upon a rigid frame member of the nose section. Other commonly known motion actuators, such as linear actuators, scissor actuators, and double pivot linkages, may suitably be incorporated for alternately extending and retracting the auxiliary jet engine.

In operation of the instant inventive fixed wing aircraft at the commencement of a take off run, the preferred "pusher" turbo-prop engine may be openly throttled for maximum thrust. Simultaneously, the outwardly extended auxiliary turbo-fan jet engine may be operated at a desired thrust. With both engines operating, the aircraft is capable of quickly lifting off the runway and aggressively climbing to clear terrain obstructions or crowded low altitude air traffic. In the event of a mechanical failure of either the primary thrust turbo-prop engine or the auxiliary turbo-fan engine during such take off maneuver, either of such engines may advantageously function as a redundant power back up, allowing the aircraft to thereafter at least maintain level flight. Upon reaching an altitude sufficient to allow a restart of the auxiliary engine in the event of a concurrent failure of the primary engine, the auxiliary jet engine may be advantageously shut down and retracted into the aircraft's nose section. Retraction of the auxiliary jet engine eliminates aerodynamic drag which would otherwise slow the aircraft and reduce its fuel economy. While the inventive aircraft flies at cruising altitude, at an optimal cruising air speed and with landing gear and auxiliary engine retracted, the aircraft maximizes fuel economy.

If a need for auxiliary back up power arises during the cruising portion of a flight, such as a mechanical failure of the primary turbo-prop engine, icing conditions, or a need to climb to clear adverse weather conditions, the auxiliary jet engine may be immediately re-extended and ignited for back up power. A further safety measure may be implemented by equipping the auxiliary jet engine with its own electrical generator, making electrical power redundantly available to the aircraft in the event of failure of the aircraft's primary turbo-prop driven generator.

Immediately prior to, and during landing maneuvers, the auxiliary jet engine is preferably re-extended and is ignited, making the engine ready for providing quick emergency power as the need may arise.

Accordingly, objects of the instant invention include the provision of a fixed wing aircraft incorporating a rearwardly mounted "pusher" propeller and a forward nose section mounted auxiliary power source.

Other and further objects, benefits, and advantages of the present invention have been explained above and will become known to those skilled in the art upon review of the Detailed Description of a Preferred Embodiment set forth below, and upon further review of the appended drawings.

DETAILED DESCRIPTION OF A PREFERRED EMBODIMENT

Figure 1:
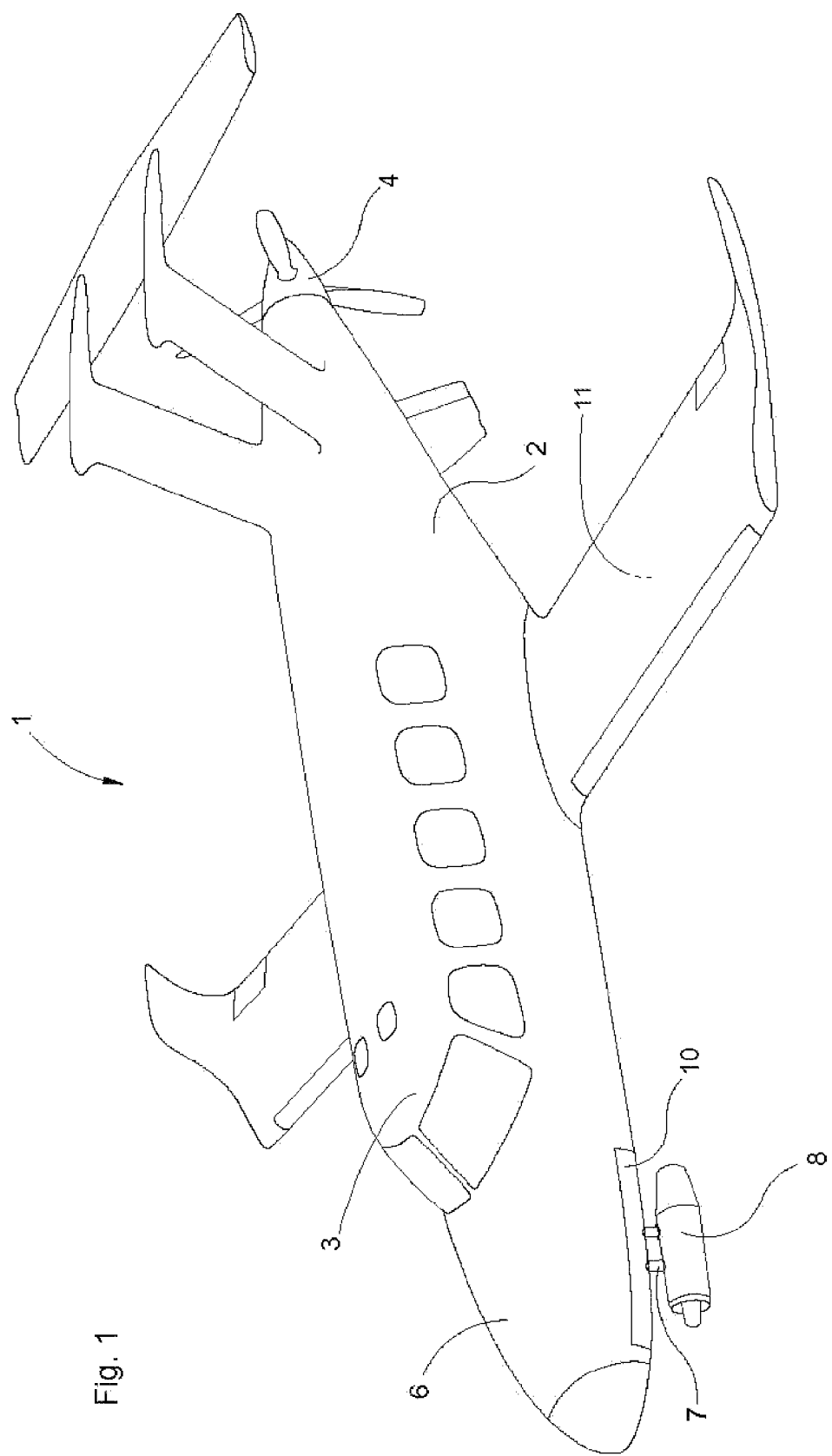
FIG. 1 is a view of a preferred embodiment of the instant inventive fixed wing aircraft, the view showing the aircraft in its in auxiliary power assisted configuration.

Referring now to the drawings, and in particular to FIG. 1, a preferred embodiment of the instant inventive fixed wing aircraft is referred to generally by Reference Arrow 1. The aircraft 1 represents an exemplary airplane having a conventional fuselage 2 housing a forward cockpit 3 for carriage of up to nine passengers or equivalent cargo, and being operated by a single pilot. A "pusher" configured variable pitch rear thrust propeller 4 is preferably mounted at the rearward or tail end of the fuselage 2 of the aircraft 1. In the depicted preferred embodiment, the "pusher" propeller 4 is powered by a rear fuselage mounted turbo-prop engine (not depicted within view).

Referring further to FIG. 1, the forward end of the fuselage 2 of the aircraft 1 preferably forms a substantially conical nose section 6. An auxiliary turbo-fan jet engine 8 is rigidly suspended upon at least a first support strut 11 which preferably extends laterally and downwardly from the nose section 6. The aircraft 1 preferably has at least a first, and preferably a plurality of fuel tanks, including wing tank 11. Both the main turbo-prop 4 and the auxiliary turbo-fan jet 8 are preferably adapted for burning a single fuel type commonly carried in all of the aircraft's fuel tanks 7. Configuring both engines to burn a common fuel advantageously maximizes the range of the aircraft in the event of failure of one of its engines.

Figure 2:
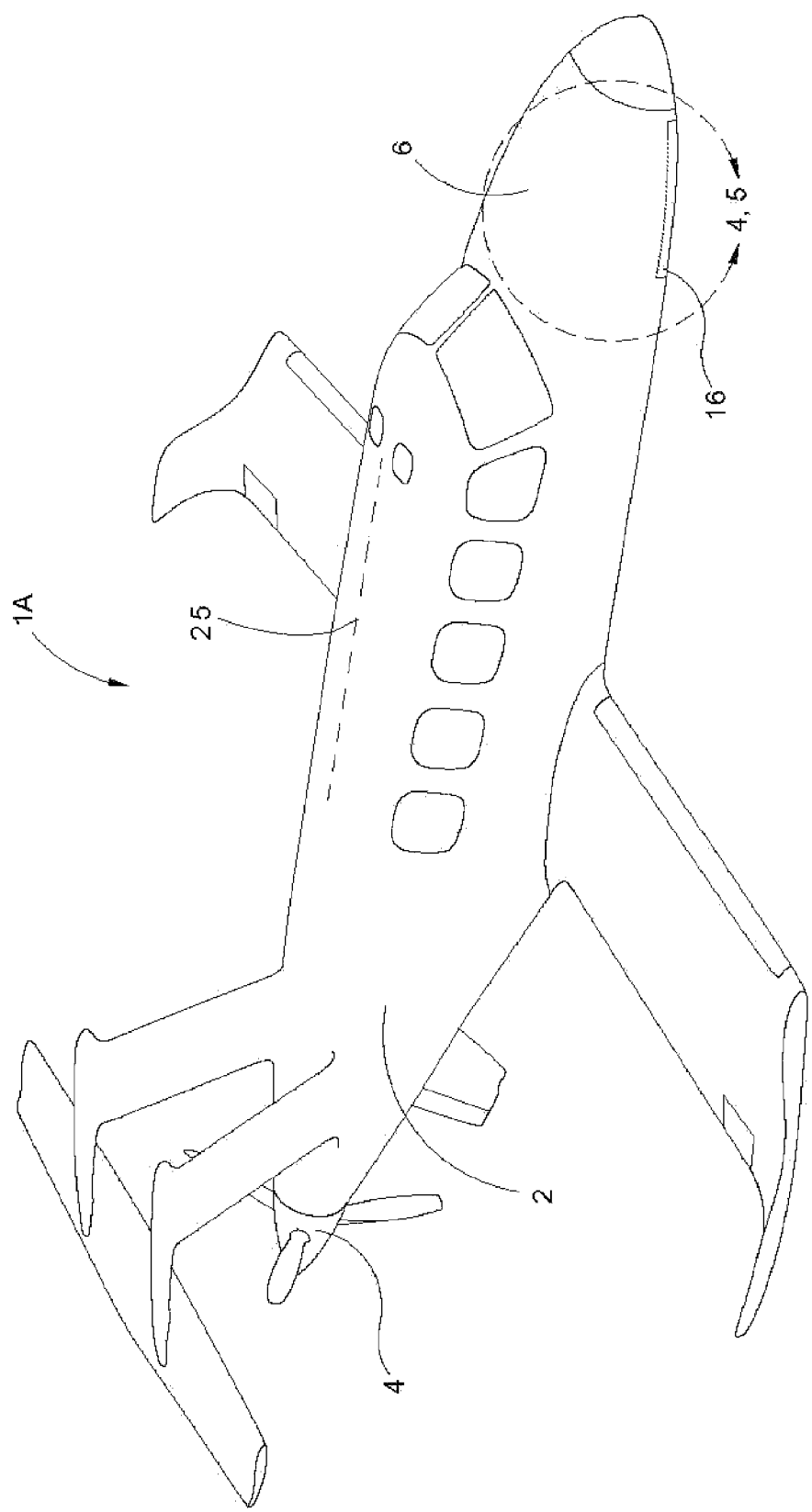
FIG. 2 is a reverse angle view of the aircraft of FIG. 1, the view of FIG. 2 showing the aircraft alternately configured in its fuel economy cruising configuration.
Figure 3:
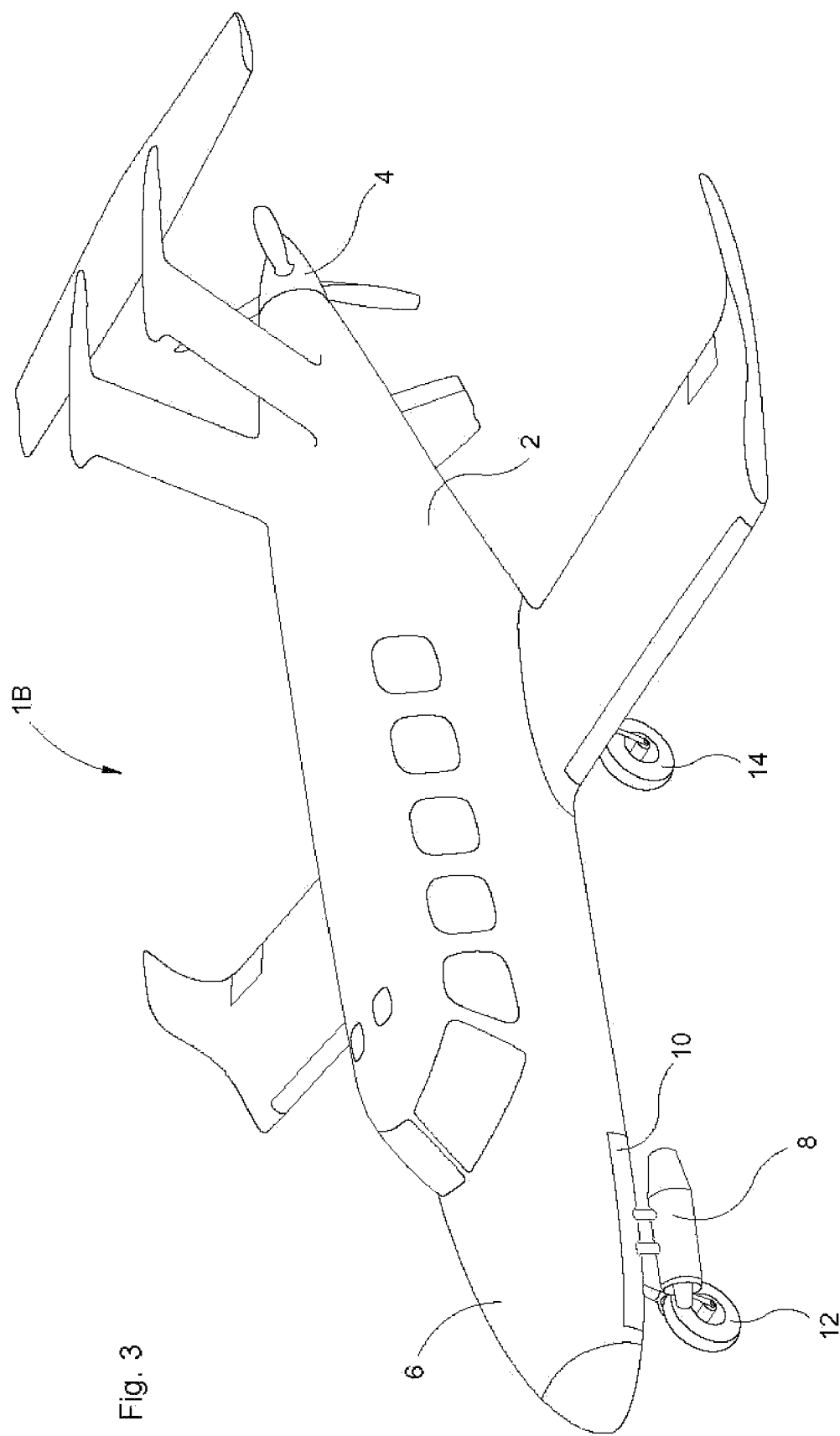
FIG. 3 redepicts FIG. 2, the view of FIG. 3 showing the aircraft alternately configured in its take off and landing configurations.
Figure 4:
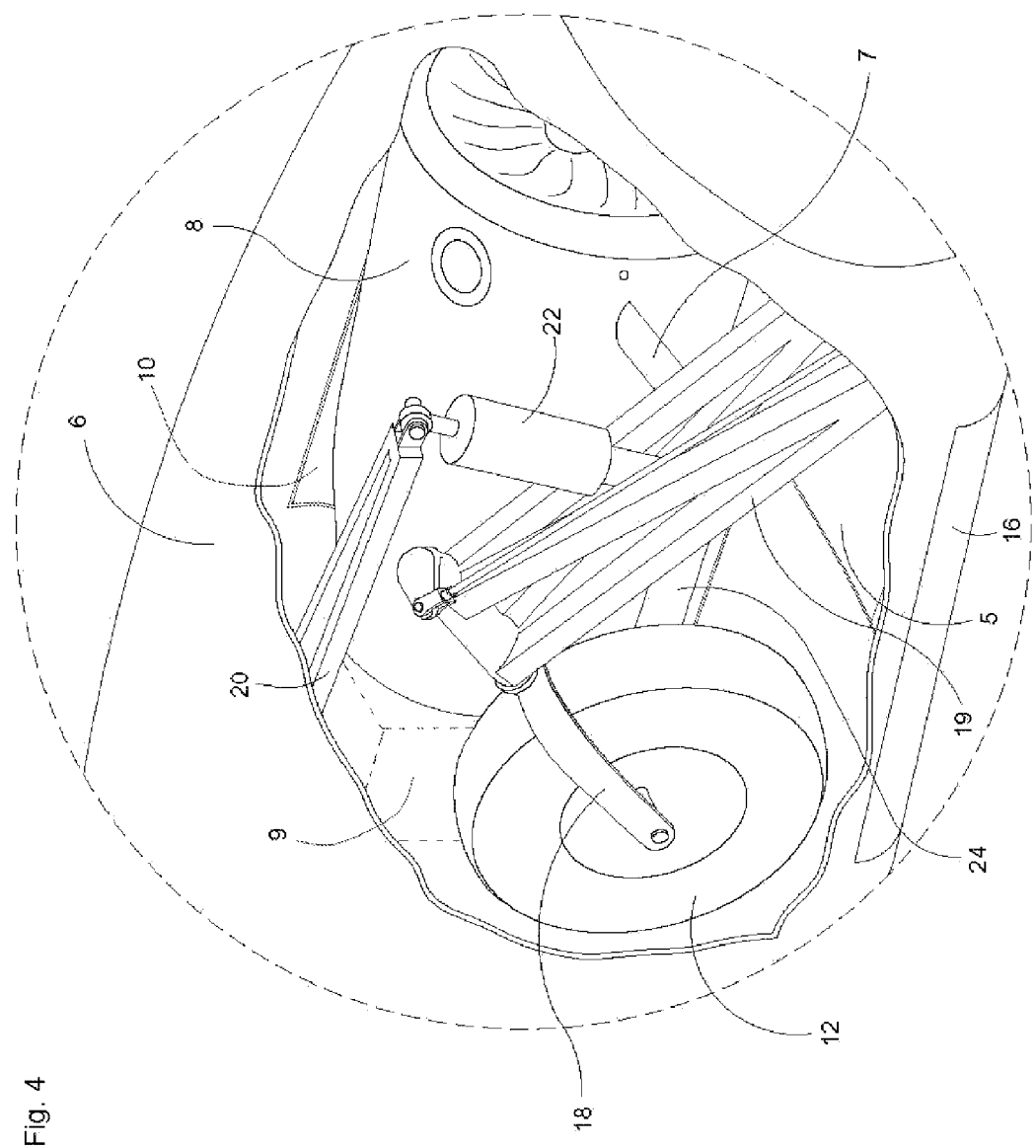
FIG. 4 is a magnified "window" view as indicated in FIG. 2, the view including, for purposes of viewing substructure, a representational "cut out" through the outer wall of the aircraft's nose section.

Referring simultaneously to FIGS. 1 and 3, the aircraft 1 of FIG. 1 is shown alternately configured in FIG. 3 with landing gear down, such gear down configuration being designated by Reference Arrow 1B. The aircraft 1B preferably has wing mounted retractable main landing gear 14 and has retractable nose wheel landing gear 12. Referring further simultaneously to FIG. 2, the nose wheel landing gear 12 is preferably adapted for alternate extension and retraction through a landing gear retraction port, such port being covered by an alternately openable and closable door 16. Referring further simultaneously to FIG. 4, the nose wheel landing gear 12 suitably comprises a wheel fork 18 which is fixedly attached to the distal end of a rearwardly extending pivot arm 19. Extending and retracting pivoting motion of the pivot arm 19 is actuated by a counter-pivoting wheel drag brace 20 which incorporates a shock absorbing damper 22. The retractable nose wheel landing gear assembly 12, 18, 19, 20, and 22 is intended to be representative both of fixed landing gear and often commonly known nose wheel landing gear retracting mechanisms, including those which alternately forwardly extend their main pivoting support arm, and include a rearwardly extending drag brace.

Figure 5:
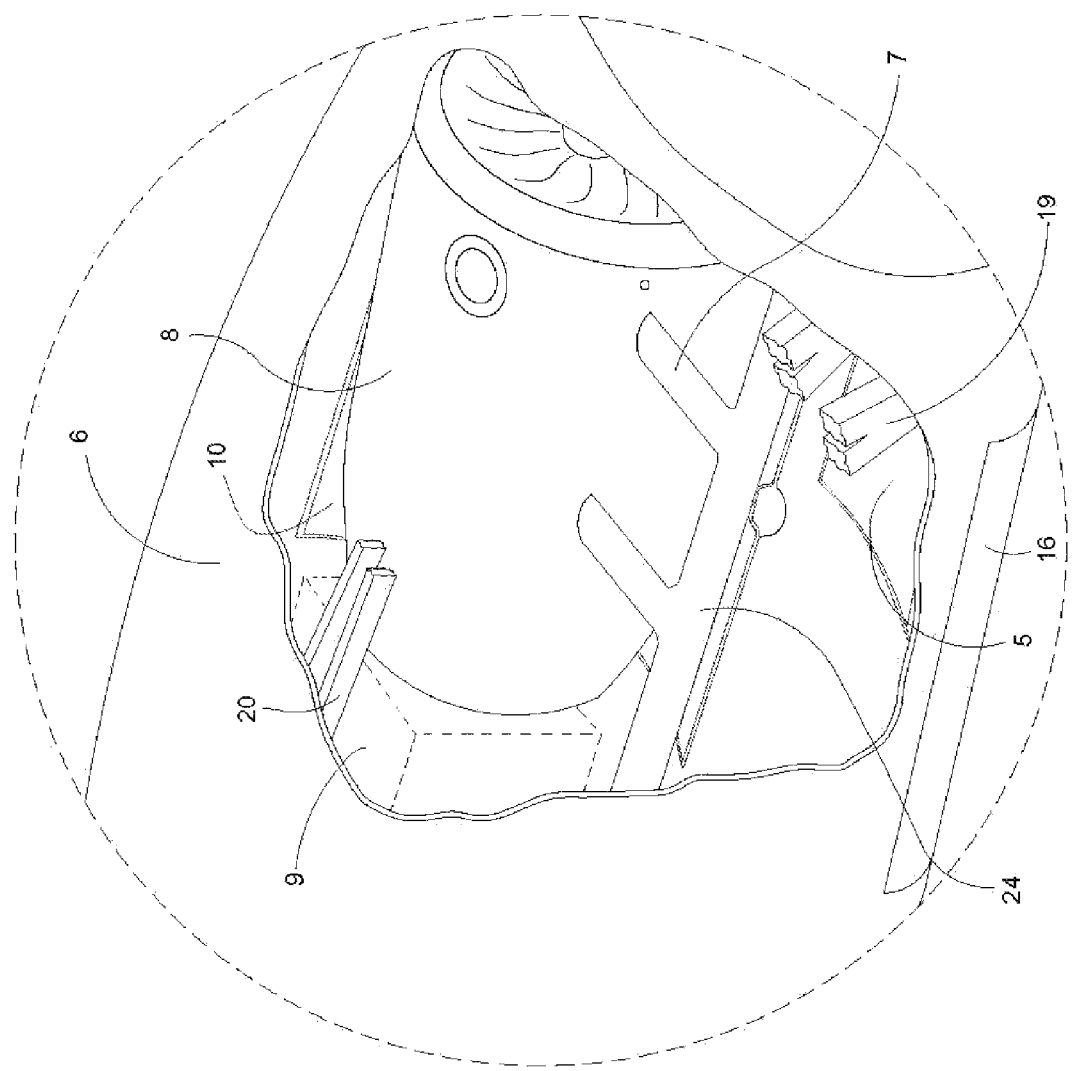
FIG. 5 redepicts FIG. 4, the view of FIG. 5 showing nose wheel landing gear structures representationally "cut away" for enhancement of view of background structures.

Referring to FIG. 5, the at least first support strut 7, which rigidly supports the turbo-fan jet engine 8, preferably extends from and moves circumferentially about a longitudinally extending pivot axle 24. The pivot axle 24 is preferably mounted upon heavy duty pivot bearings (not within view) mounted upon a frame member within the interior 5 of the aircraft's nose section 6. The rearwardly positioned dashed line structure 9 is representative of commonly known linear or rotary actuator mechanisms such as linear hydraulic cylinder actuators, pneumatic hydraulic cylinder actuators, electric motor driven jack screw actuators and the like. The actuator mechanism 9 is preferably connected operatively to pivot axle 24 for rotatably moving such axle to induce circumferential retracting and extending motions of the engine 8.

Referring simultaneously to FIGS. 1 and 5, the outer wall or sheet metal "skin" of the nose section 6 includes an auxiliary thrust port, such port being fitted for alternate outward and inward passages of the turbo-fan jet engine 8, and such port preferably being covered by a closely fitted cover plate 10. The dashed line actuator mechanism structure 9 is intended as being additionally representative of actuator means (similar to those described above for operatively rotating the pivot axle 24), the actuator means being adapted for alternately opening and closing the auxiliary thrust port cover plate 10.

Referring simultaneously to FIGS. 2 and 4, the longitudinally extending dashed line 25 appearing along the upper end of the fuselage of the aircraft 1A in FIG. 2 is representative of the aircraft's longitudinally and vertically extending plane of bilateral symmetry. In the depicted preferred embodiment, the retractable nose wheel landing gear assembly 12, 18, 19, 20, and 22 is positioned laterally from such bisecting plane of symmetry, while the turbo-fan jet engine 8 is positioned oppositely laterally on the other side of such plane. Such preferred lateral and oppositely lateral positioning of the nose wheel landing gear and auxiliary jet engine assemblies advantageously allows both assemblies to occupy the limited interior space 5 of the nose section 6, while causing neither to impose any undue yaw moment upon the aircraft during taxiing or during auxiliary power assisted flight.

In operation of the instant inventive fixed wing aircraft, and referring in particular to the configuration 1B of FIG. 3, at the beginning of the aircraft's take off run, landing gear 12 and 14 are down or extended, the turbo-prop 4 is operated at full power, and the auxiliary turbo-fan jet engine 8 is operated at a desired power level. Referring further simultaneously to FIGS. 1, 2, and 4, shortly after take off, the nose wheel landing gear assembly is preferably retracted from the gear down position depicted in FIG. 3 to the gear up position depicted in FIGS. 1, 2, and 4, causing such assembly to be housed within the interior 5 of the nose section 6. Main landing gear 14 is similarly retracted. Such retractions of landing gear advantageously reduce air drag upon the aircraft, and increase the aircraft's take off and altitude climbing performance.

Referring simultaneously to FIGS. 2 and 4, upon completion of the initial take off climb, and upon reaching an altitude at least sufficient to allow for re-extension and re-ignition of the auxiliary engine in case of a concurrent failure of the primary engine, actuator 9 may be operated to temporarily outwardly move cover plate 10 from its closed position depicted in FIG. 4 to an opened and outwardly displaced position sufficient to allow inward passage of the turbo-fan jet engine 8. Thereafter, the actuator 9 may be operated to simultaneously pivotably move the pivot axle 24, the at least first strut 7 and the turbo-fan jet engine 8 from the outwardly extended use position depicted in FIG. 3 to the inwardly retracted stowed position depicted in FIG. 4. Immediately thereafter, the actuator 9 is preferably further operated to re-close the cover plate 10 over the auxiliary thrust port, restoring aerodynamic air flow over the outer surfaces of the nose section 6.

Referring to FIG. 2, the aircraft 1A, having its landing gear and auxiliary jet engine 8 retracted and stowed, may thereafter fly at an optimal cruising speed with maximized fuel efficiency. While the turbo-fan jet engine 8 remains retracted and housed within the interior 5 of the nose section 6, such engine beneficially assists in centering the aircraft's longitudinal center of gravity by counter-balancing the rearward turbo-prop engine 4, and without imposing any fuel wasting air drag upon the aircraft.

During all maneuvers which are close to the ground, including landing maneuvers, the turbo-fan jet engine 8 is preferably extended as depicted in FIG. 1, and is ignited and readied for operation for the provision of quick emergency power in the case that power assisted maneuvers are needed.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A fixed wing aircraft comprising:
   (a) a fuselage having a forward end, having a rearward end, and having a cockpit within the forward end;
   (b) primary thrust means fixedly mounted upon the fuselage's rearward end
   (c) auxiliary jet thrust means comprising a turbo fan engine; and
   (d) mounting means interconnecting the auxiliary thrust means and the fuselage, the mounting means positioning the auxiliary thrust means at the fuselage's forward end; the fuselage's forward end comprising a nose section positioned forwardly from the cockpit, the nose section having an outer wall, and further comprising an auxiliary thrust port extending through the outer wall; the auxiliary thrust port being fitted for passage therethrough of the turbo-fan engine, and wherein the mounting means is adapted for alternately moving the turbo-fan engine between first and second positions, the turbo-fan engine residing within the nose section upon movement to the first position, the turbo-fan engine outwardly overlying the auxiliary thrust port upon movement to the second position.

2. The fixed wing aircraft of claim 1 further comprising a cover plate fitted for closing of the auxiliary thrust port, and further comprising actuating means connected operatively to the cover plate, the actuating means being adapted for alternately moving the cover plate between opened and closed positions, the cover plate substantially closing the auxiliary thrust port upon movement to the closed position, the cover plate permitting outward passage of the turbo-fan engine upon movement to the opened position.

3. The fixed wing aircraft of claim 2 wherein the mounting means comprises a substantially longitudinally aligned pivot axle and support strut combination.

4. The fixed wing aircraft of claim 1 wherein the primary thrust means comprises a pusher propeller.

5. The fixed wing aircraft of claim 4 wherein the primary thrust means further comprises motor means connected operatively to the pusher propeller, the motor means comprising a turbo-prop engine.

6. The fixed wing aircraft of claim 5 wherein the auxiliary thrust means comprises a turbo-fan engine, and further comprising at least a first fuel tank, the turbo-prop engine and the turbo-fan engine each being adapted to burn fuel from the at least first fuel tank.

7. The fixed wing aircraft of claim 6 wherein the fuselage's forward end comprises a nose section, the nose section having an outer wall, and further comprising an auxiliary thrust port extending through the outer wall.

8. The fixed wing aircraft of claim 7 wherein the auxiliary thrust port is fitted for passage therethrough of the turbo-fan engine, and wherein the mounting means is adapted for alternately moving the turbo-fan engine between first and second positions, the turbo-fan engine residing within the nose section upon movement to the first position, the turbo-fan engine outwardly overlying the auxiliary thrust port upon movement to the second position.

9. The fixed wing aircraft of claim 8 further comprising a cover plate fitted for closing of auxiliary thrust port, and further comprising actuating means connected operatively to the cover plate, the actuating means being adapted for alternately moving the cover plate between opened and closed positions, the cover plate substantially closing the auxiliary thrust port upon movement to the closed position, the cover plate permitting outward passage of the turbo-fan engine upon movement to the opened position.

10. The fixed wing aircraft of claim 9 wherein the mounting means comprises a substantially longitudinally aligned pivot axle and support strut combination.

11. The fixed wing aircraft of claim 1 further comprising retractable nose wheel landing gear, the retractable nose wheel landing gear, upon its retraction and upon movement of the turbo-fan engine to the first position, residing within the fuselage's nose section and being positioned laterally from the turbo-fan engine.

12. The fixed wing aircraft of claim 11 wherein the fuselage has a longitudinal and vertical plane of bilateral symmetry, and wherein the retractable nose wheel landing gear and the turbo-fan engine are positioned laterally and oppositely laterally from plane.

* * * * *